United States Patent
Huang et al.

(10) Patent No.: US 8,405,516 B2
(45) Date of Patent: Mar. 26, 2013

(54) PORTABLE ELECTRONIC DEVICE AND UNLOCKING METHOD THEREOF

(75) Inventors: Po-Tai Huang, Tu-Cheng (TW); Chia-Hui Liao, Tu-Cheng (TW)

(73) Assignee: Chi Mei Communications Systems, Inc., New Taipei (TW)

( * ) Notice: Subject to any disclaimer, the term of this patent is extended or adjusted under 35 U.S.C. 154(b) by 434 days.

(21) Appl. No.: 12/873,292

(22) Filed: Aug. 31, 2010

(65) Prior Publication Data

US 2012/0026001 A1    Feb. 2, 2012

(30) Foreign Application Priority Data

Jul. 29, 2010  (CN) .................. 99125062 A

(51) Int. Cl.
| G08B 21/00 | (2006.01) |
| G09G 5/00 | (2006.01) |
| G01C 17/00 | (2006.01) |
| B60Q 1/50 | (2006.01) |
| H04M 1/66 | (2006.01) |
| H04M 3/00 | (2006.01) |
| H04N 5/225 | (2006.01) |

(52) U.S. Cl. ........ 340/689; 340/967; 340/467; 340/669; 455/411; 455/418; 455/419; 345/156; 345/158; 348/208.1; 348/208.2; 702/151

(58) Field of Classification Search .................. None
See application file for complete search history.

(56) References Cited

U.S. PATENT DOCUMENTS

| 7,698,096 B2 * | 4/2010 | Ohta ........................... 702/151 |
| 8,150,384 B2 * | 4/2012 | Abifaker et al. ............ 455/418 |
| 2005/0212750 A1 * | 9/2005 | Marvit et al. ............... 345/156 |
| 2007/0176898 A1 * | 8/2007 | Suh ............................. 345/158 |
| 2008/0020733 A1 * | 1/2008 | Wassingbo .................. 455/411 |

* cited by examiner

*Primary Examiner* — Jennifer Mehmood
*Assistant Examiner* — Fekadeselassie Girma
(74) *Attorney, Agent, or Firm* — Altis Law Group, Inc.

(57) ABSTRACT

A method executes a gyroscope function to unlock a portable electronic device. A user can rotate the portable electronic device to set a predetermined rotation direction and a predetermined rotation angle for unlocking the portable electronic device. In an unlock procedure, the gyroscope detects the rotated portable electronic device and outputs detected information of the portable electronic device. If the rotation direction and the rotation angle are the same as the predetermined rotation direction and the predetermined rotation angle, the locked portable electronic device is unlocked.

13 Claims, 3 Drawing Sheets

PORTABLE ELECTRONIC DEVICE AND UNLOCKING METHOD THEREOF

BACKGROUND

1. Technical Field

Embodiments of the present disclosure relate to unlocking methods of an electronic device, and more particularly to a method for unlocking a screen of a portable electronic device by using a gyroscope and a storage medium thereof.

2. Description of Related Art

A common unlocking technique for a portable electronic device is to input an alpha-numeric passcode using a physical keypad of the electronic device or a virtual keypad displayed on a touch screen of the portable electronic device. However, remembering the alpha-numeric passcode may be difficult for the user. What is needed, therefore, is an unlocking method of the portable electronic device to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or Assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
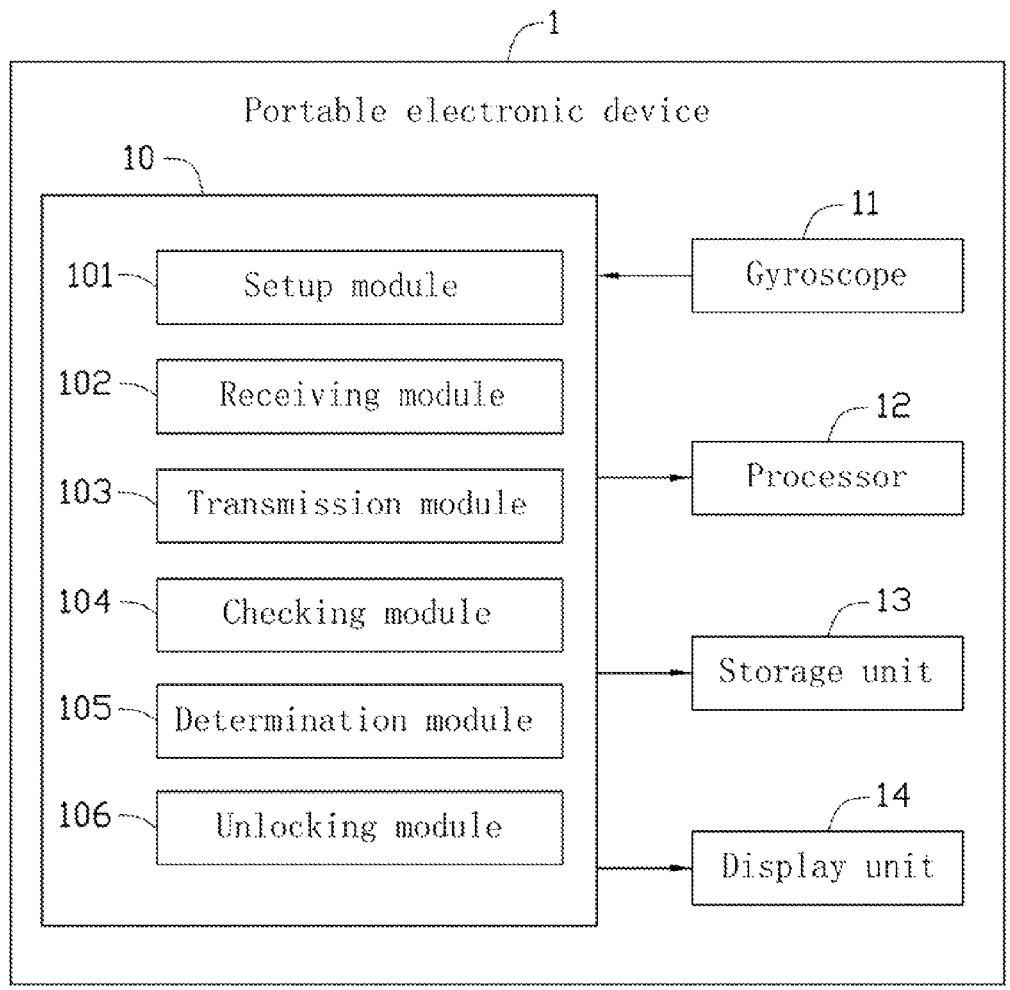
FIG. 1 is a block diagram of one embodiment of a portable electronic device.

FIG. 1 is a block diagram of one embodiment of a portable electronic device 1. Depending on the embodiment, the portable electronic device 1 can be a mobile phone, a personal digital assistant (PDA), a handheld game console, a digital camera (DC), or a handheld computer. The portable electronic device 1 includes a system 10, a gyroscope 11, at least one processor 12, a storage unit 13, a display unit 14, and one or more programs including a setup module 101, a receiving module 102, a transmission module 103, a checking module 104, a determination module 105, and an unlocking module 106. The system 10 can set a predetermined rotation direction and a predetermined rotation angle to unlock the portable electronic device 1 and saves the predetermined information in the storage unit 13.

The portable electronic device 1 is generally controlled and coordinated by an operating system software, such as UNIX, Linux, Windows 95, 98, NT, 2000, XP, Vista, Mac OS X, an embedded operating system, or any other compatible operating systems. In other embodiments, the portable electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

The gyroscope 11 is operable to detect an angular rate of the portable electronic device 1. After processing the angular rate by an internal processor of the gyroscope 11, the gyroscope 11 can detect a rotation direction and a rotation angle of the portable electronic device 1. The system 10 can receive the rotation direction and the rotation angle of the portable electronic device 1, and then the system 10 controls the transmission module 103 to output the information received from the gyroscope 11 to the display unit 14 to inform the user. According to displayed information on the display unit 14, the user can unlock the display unit 14 of the portable electronic device 1 by adjusting the rotation direction and the rotation angle of the portable electronic device 1. If the adjusted rotation direction and rotation angle match the predetermined information stored in the storage unit 13, the portable electronic device 1 can be unlocked.

For example, the predetermined rotation direction is set as a clockwise direction and the predetermined rotation angle is set at 45 degrees are saved in the storage unit 13. During an unlocking period, if the user rotates the portable electronic device 1 in a clockwise direction to a 30 degree rotation angle, at the same time, the display unit 14 displays that the portable electronic device 1 has been rotated to 30 degree rotation angle in the clockwise direction. The user can continually adjust the portable electronic device 1 until the rotation angle displays in the display unit 14 is 30 degrees to unlock the locked screen of the portable electronic device 1.

The modules 101-106 may comprise computerized code in the form of one or more programs that are stored in the storage unit 13 (or memory). The computerized code includes instructions that are executed by the at least one processor 12 to provide functions for modules 101-106. The at least one processor 12, as an example, may include a CPU, math coprocessor, shift register, for example.

The storage unit 13 is electronically connected to the gyroscope 11, the least one processor 12, the setup module 101, the receiving module 102, the transmission module 103, the checking module 104, the determination module 105 and the unlocking module 106. The storage unit 13 is operable to store many kinds of data, such as the rotation direction and the rotation angle detected from the gyroscope 11, a customization function code of the portable electronic device 1, computerized codes of the system 10, programs of an operating system and other applications of the portable electronic device 1. The storage unit 13 may include a hard disk drive, flash memory, RAM, ROM, cache, or external storage mediums.

The display unit 14 displays information related to the rotation angle information of the portable electronic device 1. The display unit 14 can be a display screen, a resistive touch screen, or a capacitive touch screen.

The system 10 further detects the rotation direction and the rotation angle of the portable electronic device 1 during the unlocking period. In addition, the system 10 saves detected information of the rotation direction and the changed rotation angle of the portable electronic device 1 in the storage unit 13.

The setup module 101 is operable to set the predetermined rotation direction and the predetermined rotation angle to unlock the portable electronic device 1. In setting an unlock condition, the gyroscope 11 continually detects the rotation direction and the rotation angle of the portable electronic device 1. The setup module 101 then saves the rotation direction and the rotation angle detected from the gyroscope 11 as the predetermined rotation direction and the predetermined rotation angle from the gyroscope 11 in the storage unit 13. The predetermined rotation direction and the predetermined rotation angle are set to unlock the portable electronic device 1.

Figure 2:
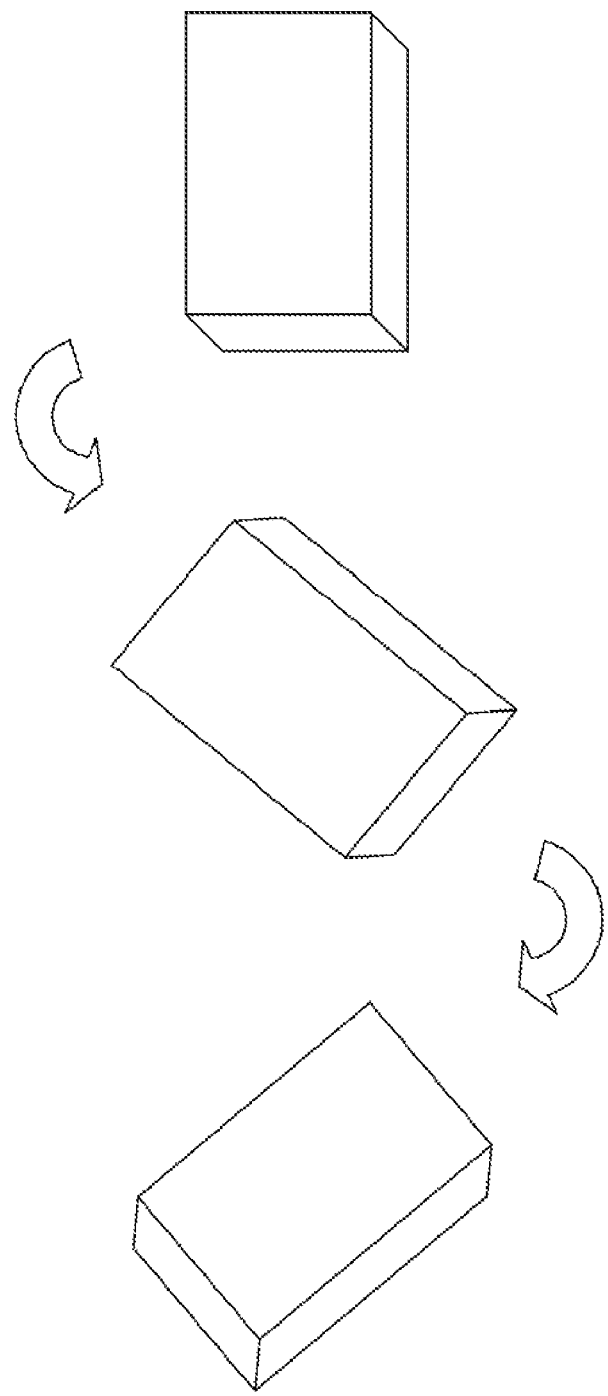
FIG. 2 is a schematic diagram of the portable electronic device of FIG. 1 setting predetermined conditions for an unlocking operation.

As shown in FIG. 2, a schematic diagram of the portable electronic device 1 setting the predetermined rotation direction and the predetermined rotation angle for an unlocking operation is shown. The setup module 101 sets the predetermined rotation direction and the predetermined rotation angle by rotating the portable electronic device 1 to 45 degrees in a counterclockwise direction to a reference plane of a panel surface of the display unit 14. The portable electronic device 1 continually rotates to 90 degrees in a clockwise direction. Accordingly, the predetermined information of the rotation direction and the rotation angle are set as 45 degrees in counterclockwise direction and 90 degrees in clockwise direction for unlocking the display unit 14 of the portable electronic device 1.

In addition, the setup module 101 is also operable to set a predetermined time period to determine whether the rotation of the portable electronic device 1 has stopped. For example, the setup module 101 sets the predetermined time period equal to about 0.5 seconds. The predetermined time period is set as a prior time period to a current time. For example, if the current time is 09:40:40 a.m. and the predetermined time period is 0.5 seconds, the time period is set from 09:39:39.5 a.m. The checking module 104 determines whether the rotation direction and rotation angle stored in the storage unit 13 change during a period of 09:39:39.5 a.m. and 09:40:40 a.m.

The receiving module 102 is operable to receive the rotation direction and the rotation angle of the portable electronic device 1 detected from the gyroscope 11 during the rotation period. Furthermore, the receiving module 102 saves the received information in the storage unit 13.

The transmission module 103 is operable to transmit the rotation direction and the rotation angle of the portable electronic device 1 received from the receiving module 102 to the display unit 14 to inform the user.

The checking module 104 is operable to determine whether the rotation direction and the rotation angle stored in the storage unit 13 change within the predetermined time period. For example, if the rotation direction and rotation angle stored in the storage unit 13 do not change within the predetermined time period, the checking module 104 determines the rotation of the portable electronic device 1 has stopped. If the rotation direction and the rotation angle stored in the storage unit 13 change within the predetermined time period, the checking module 104 determines that the portable electronic device 1 is rotated for unlocking.

The determination module 105 is operable to determine whether the rotation direction and the rotation angle are the same as the predetermined rotation direction and the predetermined rotation angle. In one embodiment, the receiving module 102 continually saves the rotation direction and the rotation angle of the portable electronic device 1 detected from the gyroscope 11 in the storage unit 13 during the rotation period. The determination module 105 reads the rotation direction and the rotation angle, the predetermined rotation direction, and the predetermined rotation angle stored in the storage unit 13. Then, the determination module 105 determines whether the rotation direction and rotation angle are same as the predetermined rotation direction and the predetermined rotation angle. If the rotation direction and the rotation angle are not the same as the predetermined rotation direction and the predetermined rotation angle, the determination module 105 determines that the portable electronic device 1 stays locked. Otherwise, If the rotation direction and the rotation angle are the same as the predetermined rotation direction and the predetermined rotation angle, the determination module 105 sends an unlock signal to the unlocking module 106.

The unlocking module 106 is operable to receive the unlock signal from the determination module 105 and control the least one processor 12 to unlock the portable electronic device 1.

Figure 3:
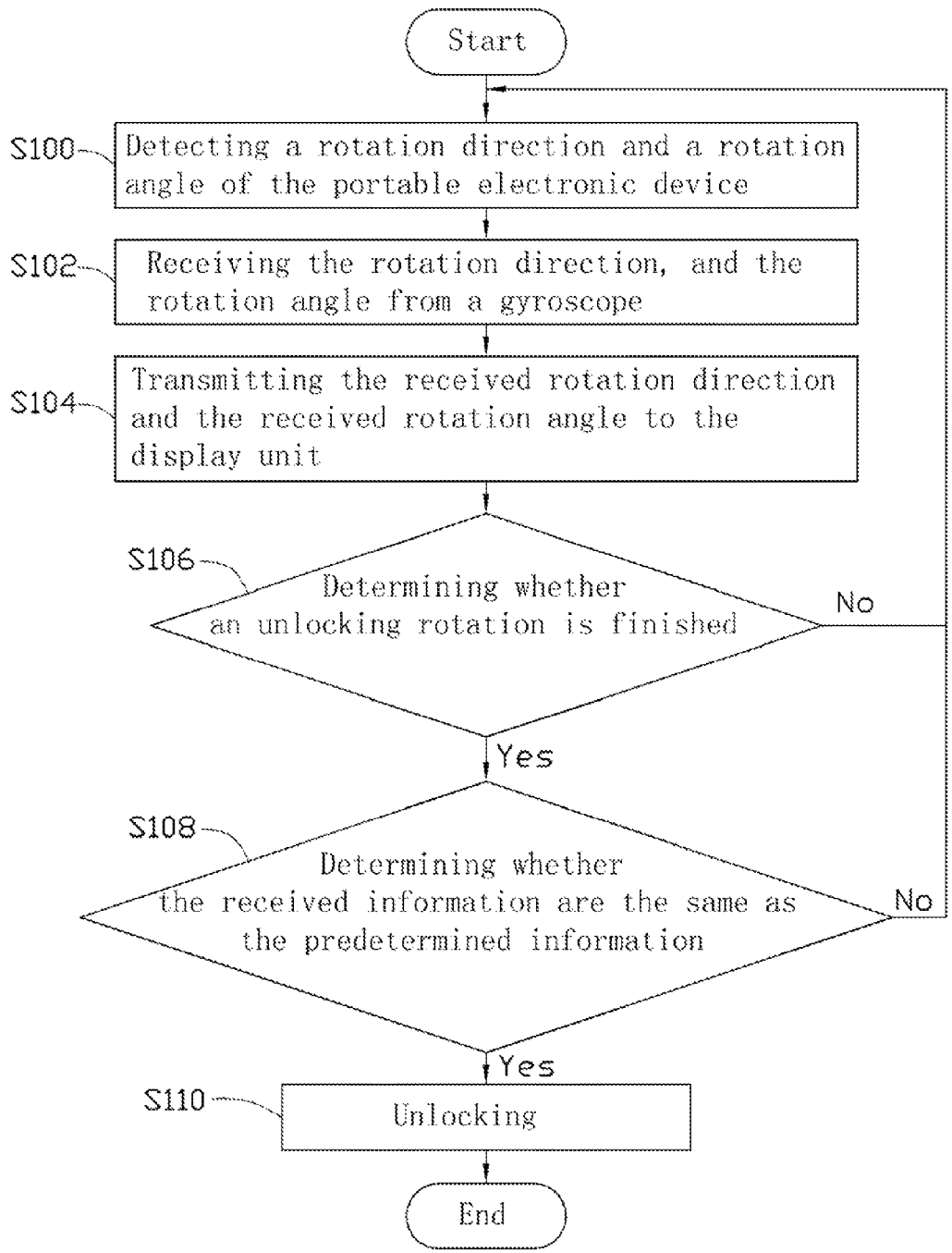
FIG. 3 is a flowchart of one embodiment of a method for unlocking a portable electronic device.

FIG. 3 is a flowchart of one embodiment of a method for unlocking a portable electronic device 1. Depending on the embodiment, additional blocks may be added, others deleted, and the ordering of the blocks may be changed.

In block S100, the gyroscope 11 detects a rotation direction and a rotation angle of the portable electronic device 1.

In block S102, the receiving module 102 receives the rotation direction and the rotation angle of the portable electronic device 1 detected from the gyroscope 11 and saves received information in the storage unit 13.

In block S104, the transmission module 103 transmits the rotation direction and the rotation angle of the portable electronic device 1 from the receiving module 102 to the display unit 14.

In block S106, the checking module 104 determines whether the rotation direction and the rotation angle stored in the storage unit 13 change within a predetermined time period. If the rotation direction and the rotation angle stored in the storage unit 13 change within the predetermined time period, the checking module 104 determines the rotation of the portable electronic device 1 is continually rotating and returns to block S100. If the rotation direction and the rotation angle stored in the storage unit 13 do not change within the predetermined time period, block S108 is implemented.

In block S108, the determination module 105 determines whether the rotation direction and the rotation angle are the same as the predetermined information of rotation direction and rotation angle of the portable electronic device 1 stored in the storage unit 13. In one embodiment, the determination module 105 reads the rotation direction, the rotation angle, the predetermined rotation direction, and the predetermined rotation angle stored in the storage unit 13. Then, the determination module 105 determines whether the rotation direction and the rotation angle are the same as the predetermined rotation direction and the predetermined rotation angle. If the rotation direction and the rotation angle are not the same as the predetermined rotation direction and the predetermined rotation angle, the determination module 105 determines that portable electronic device 1 stays locked and returns to block 100. If the rotation direction and the rotation angle are the same as the predetermined rotation direction and the predetermined rotation angle, block S110 is implemented.

In block S110, the unlocking module 106 sends an unlock signal to the least one processor 12 and controls the least one processor 12 to unlock the portable electronic device 1.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
   a storage unit;
   a display unit;
   at least one processor;
   a gyroscope operable to detect a rotation direction and a rotation angle of the portable electronic device;
   one or more programs that are stored in the memory and are executed by the at least one processor, the one or more programs comprising:
   a setup module operable to set a predetermined rotation direction and a predetermined rotation angle for unlocking the portable electronic device;
   a receiving module operable to receive the rotation direction and the rotation angle of the portable electronic device detected from the gyroscope and save the received information of the rotation direction and the rotation angle in the storage unit;
   a checking module operable to determine whether the rotation direction and the rotation angle stored in the storage unit change within a predetermined time period;
   a determination module operable to determine whether the rotation direction and the rotation angle are the same as the predetermined rotation direction and the predetermined rotation angle if the rotation direction and the rotation angle do not change within the predetermined time period; and
   an unlocking module operable to control the least one processor to unlock the portable electronic device if the rotation direction and the rotation angle are the same as the predetermined rotation direction and the predetermined rotation angle;
   wherein the setup module further sets the predetermined time period.

2. The portable electronic device of claim 1, the device further comprising:
   a transmission module operable to transmit the rotation direction and the rotation angle received from the receiving module to the display unit.

3. The portable electronic device of claim 1, wherein the at least one processor unlocks the portable electronic device by unlocking a screen lock or a key lock.

4. A computer-implemented method for unlocking a portable electronic device, the portable electronic device comprising a gyroscope, a storage unit, a display unit and at least one processor, the method comprising:
   receiving a rotation direction and a rotation angle of the portable electronic device detected from the gyroscope;
   determining whether the rotation direction and the rotation angle stored in the storage unit change within a predetermined time period; determining whether the rotation direction and the rotation angle are the same as a predetermined rotation direction and a predetermined rotation angle stored in the storage unit if the rotation direction and the rotation angle do not change within the predetermined time period; and
   unlocking the portable electronic device if the rotation direction and the rotation angle are the same as the predetermined rotation direction and the predetermined rotation angle;
   setting the predetermined time period for unlocking the portable electronic device and saving the predetermined time period in the storage unit.

5. The method of claim 4, further comprising saving the rotation direction and the rotation angle in the storage unit.

6. The method of claim 4, further comprising:
   transmitting the rotation direction and the rotation angle of the portable electronic device from the receiving module to the display unit.

7. The method of claim 4, wherein the step of unlocking the portable electronic device is by unlocking a screen lock or a key lock.

8. The method of claim 4, further comprising the following steps to set the predetermined rotation direction and the predetermined rotation angle:
   rotating the portable electronic device;
   detecting the rotation direction and the rotation angle of the portable electronic device by the gyroscope; and
   receiving the rotation direction and the rotation angle and saving them as the predetermined rotation direction and the predetermined rotation angle in the storage unit.

9. A non-transitory storage medium having stored thereon instructions that, when executed by a processor, causes the processor to perform a method for unlocking a portable electronic device, the method comprising:
   receiving a rotation direction and a rotation angle of the portable electronic device detected from the gyroscope;
   determining whether the rotation direction and the rotation angle stored in the storage unit change within a predetermined time period;
   determining whether the rotation direction and the rotation angle are the same as a predetermined rotation direction and a predetermined rotation angle stored in the storage unit if the rotation direction and the rotation angle do not change within the predetermined time period; and
   unlocking the portable electronic device if the rotation direction and the rotation angle are the same as the predetermined rotation direction and the predetermined rotation angle;
   setting the predetermined time period for unlocking the portable electronic device and saving the predetermined time period in the storage unit.

10. The storage medium of claim 9, wherein the method further comprising saving the rotation direction and the rotation angle in the storage unit.

11. The storage medium of claim 9, wherein the method further comprising:
    transmitting the rotation direction and the rotation angle of the portable electronic device from the receiving module to the display unit.

12. The storage medium of claim 9, wherein the step of unlocking the portable electronic device is by unlocking a screen lock or a key lock.

13. The storage medium of claim 9, wherein the method further comprising the following steps to set the predetermined rotation direction and the predetermined rotation angle:
    rotating the portable electronic device;
    detecting the rotation direction and the rotation angle of the portable electronic device by the gyroscope; and
    receiving the rotation direction and the rotation angle and saving them as the predetermined rotation direction and the predetermined rotation angle in the storage unit.

* * * * *